(12) United States Patent
Kim et al.

(10) Patent No.: US 7,924,777 B2
(45) Date of Patent: Apr. 12, 2011

(54) METHOD FOR DECIDING TRANSMISSION PRIORITY OF NON-REALTIME DATA AND APPARATUS AND METHOD FOR CONTROLLING INTERFERENCE BETWEEN CELLS USING THE SAME

(75) Inventors: Hyung-Sub Kim, Daejon (KR); Jae-Su Song, Daejon (KR); Yeon-Seung Shin, Daejon (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 150 days.

(21) Appl. No.: 12/166,887

(22) Filed: Jul. 2, 2008

(65) Prior Publication Data
US 2009/0016223 A1    Jan. 15, 2009

(30) Foreign Application Priority Data
Jul. 11, 2007    (KR) ........................ 10-2007-0069631

(51) Int. Cl.
*H04W 16/02* (2009.01)
(52) U.S. Cl. ....................................... 370/328; 455/446
(58) Field of Classification Search ........................ None
See application file for complete search history.

(56) References Cited

U.S. PATENT DOCUMENTS

| | | | | |
|---|---|---|---|---|
| 6,023,623 | A | * | 2/2000 | Benkner et al. ............. 455/452.2 |
| 6,115,390 | A | * | 9/2000 | Chuah ............................ 370/443 |
| 2006/0292989 | A1 | * | 12/2006 | Gerlach et al. ................ 455/63.1 |

FOREIGN PATENT DOCUMENTS

| KR | 10-2006-0130493 | 12/2006 |
|---|---|---|
| KR | 10-2006-0131628 | 12/2006 |

OTHER PUBLICATIONS

A. Jalali et al., Data Throughout of CDMA-HDR a High Efficiency-High Data Rate Personal Communication Wireless System, IEEE, Vehicular Technology Conference Proceedings, VTC 2000-Spring, vol. 3 pp. 1854-1858, May 2000.
Office Action issued by Korean Intellectual Property Office on Nov. 25, 2008.
Jianchi Zhu, et al., "A Hybrid Inter-cell Interface Mitigation Scheme for OFDMA based E-Utra Downlink", (Communications, 2006, Asia-Pacific Conference on, 2006).

\* cited by examiner

*Primary Examiner* — Kwang B Yao
*Assistant Examiner* — Alex Skripnikov
(74) *Attorney, Agent, or Firm* — Kile Park Goekjian Reed & McManus PLLC

(57) ABSTRACT

There is provided a method for deciding a transmission priority of non-realtime data, the method including: receiving a user requested data transfer rate; confirming an average data transfer rate allocated previously to a user terminal; and deciding a transmission priority using the received user requested data transfer rate and the previously allocated average data transfer rate.

5 Claims, 2 Drawing Sheets

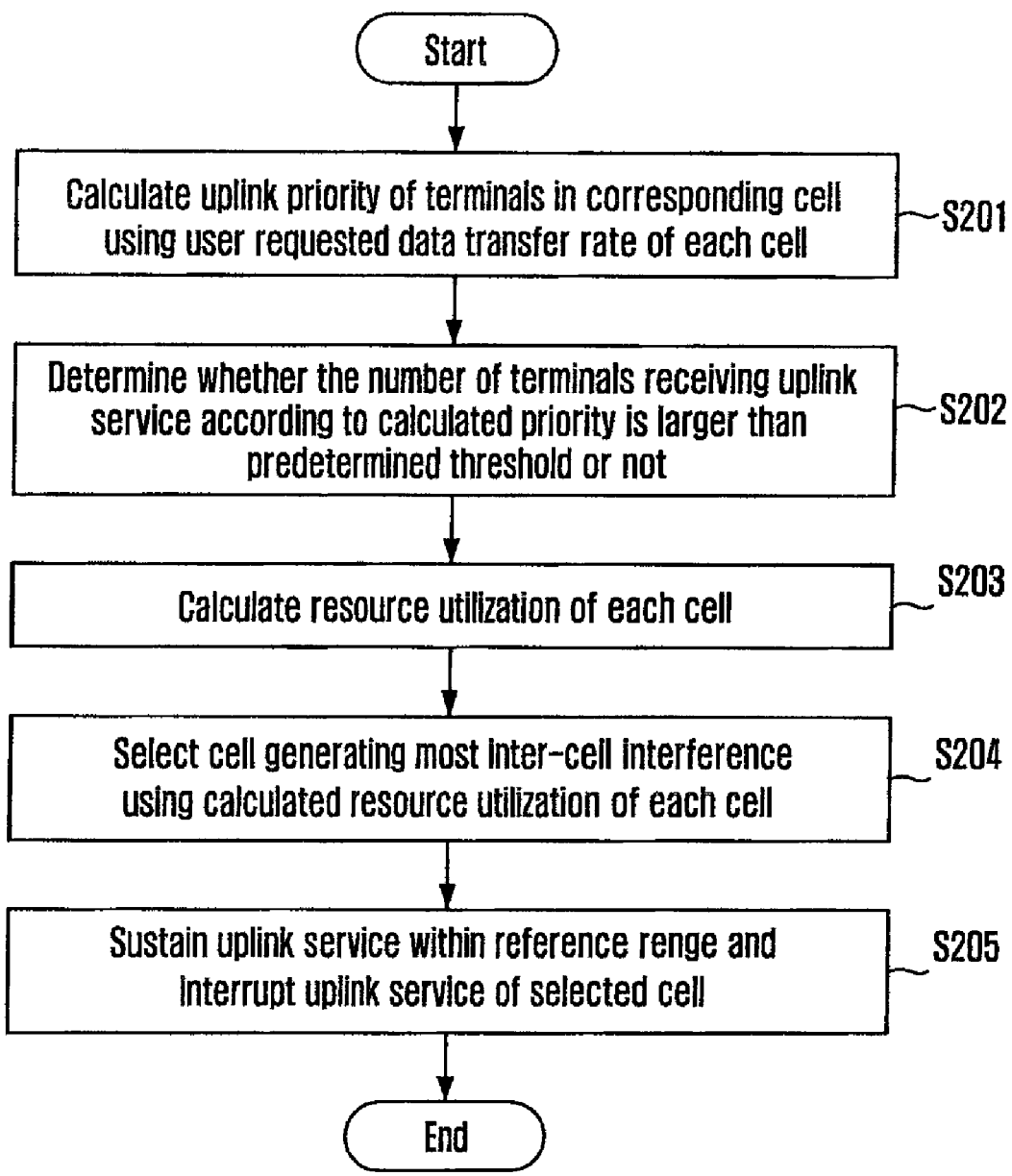

METHOD FOR DECIDING TRANSMISSION PRIORITY OF NON-REALTIME DATA AND APPARATUS AND METHOD FOR CONTROLLING INTERFERENCE BETWEEN CELLS USING THE SAME

BACKGROUND OF THE INVENTION

1. Field of the Invention

The present invention relates to a method for deciding a transmission priority of non-realtime data, and an apparatus and method for controlling inter-cell interference using the same; and, more particularly, to a method for deciding a transmission priority of non-realtime data, and an apparatus and method for controlling inter-cell interference using the same, which calculate uplink priorities of terminals in a corresponding cell using a user requested data transfer rate by each cell under a predetermined condition, provide services according to the calculated uplink priorities, and interrupt an uplink service in a corresponding cell based on resource utilization and inter-cell interference in order to improve system performance.

This work was supported by the IT R&D program of MIC/IITA [2005-S-404-23, "Research and development on 3G long-term evolution access system"].

2. Description of Related Art

The performance of a code division multiple access (CDMA) system depends on interferences. The interferences are classified into an inner cell interference generated between terminals that share one base station and inter-cell interference generated between cells that use the same frequency. Also, the interferences are classified according to a service type into downlink interference that influences one terminal because a plurality of base station transmit signals to a terminal, and uplink interference that influences one base station because a plurality of terminals transmit signals to a base station.

Since a downlink service is provided to single user in a cell at a predetermined time, the downlink service does not have inner cell interference. In this case, inter-cell interference is only the consideration.

Since an uplink service is simultaneously provided to a plurality of users in one cell at a predetermined time, it is required to control not only inter-cell interference but also inner cell interference.

Since users or terminals usually have bad wireless channel environment at a boundary of a cell, the users not only deteriorates throughput of a corresponding cell but also generates inter-cell interference to adjacent cells because the users are very close to the adjacent cells. In order to improve system performance, it is necessary to define constraints for the users. It is also necessary to control an entire cell having users crowded at a boundary thereof in order to control the inter-cell interference.

The inter-cell interference acts on a plurality of cells. Inter-cell interference coordinate is a technology for improving overall performance of a CDMA system by reducing inter-cell interference.

There have been many studies made for developing an inter-cell interference control scheme for a downlink service. For example, a frequency division scheme and a time division scheme where introduced. The frequency division scheme sets up a frequency reuse factor differently. The time division scheme sets up a service priority differently according to time division.

At first, the frequency division scheme will be described.

Since a frequency resource of a system is limited, the same frequency is repeatedly used with a predetermined pattern. The major factor of the frequency division scheme is how much frequency is used and how effectively frequency is used in order to reduce inner cell interference. Generally, a frequency is differently setup for a center area from that for a boundary of a cell.

The inter-cell interference is not a big problem at a center area of a cell. It is because the center area is far away from adjacent cells. Also, the inter-cell interference does not badly influence overall system performance because users at the center area have good link status. Therefore, the same frequency can be used in the center area of each cell. It is because inter-cell interference between center areas of adjacent cells can be ignorable although it is not 0.

On the contrary, the inter-cell interference seriously influences cell boundary areas and is a major factor that deteriorates system performance. Therefore, all of cells use different frequencies at the cell boundary areas. Also, the center area of a cell uses a frequency different from that used at the boundary area of the cell. That is, efficiency of using a frequency may be improved by reducing inter-cell interference and using only one frequency.

Hereinafter, the time division scheme will be described. In the time division scheme, a frequency band is differently setup by a service class, and the same service is not provided to cells using the same frequency at the same time. Although the time division scheme is an algorithm having high efficiency for utilization of a limited frequency, the time division scheme has shortcoming of difficulty to apply the time division scheme when the number of users abruptly increases or when demands for a predetermined service abruptly increase.

Also, the inter-cell interference can be controlled through power control as well as frequency control. In general, power is controlled in consideration of only interference between users in the same cell for scheduling. However, power may be controlled in consideration of how much users influence another cell by calculating the optimal power.

In a non-realtime data service, an average transfer rate for non-realtime data is more important than a burst transfer rate in a view of QoS. It means that users of the non-realtime service may not have any problem although a predetermined service is not provided at a predetermined time.

Using such fact, a method for improving overall system performance is developed. That is, overall system performance may be improved by instantly closing a cell that generates a lot of inter-cell interference and has low cell resource utilization, for example, interrupting a service for all users.

Hereinafter, a method for deciding a transmission priority of non-realtime data according to the related art will be described.

If a CDMA system includes M uplink service terminals, a link gain between a base station i and a terminal k is given as $g_{ik}$. The link gain denotes the transmission power of a transmitting side, which is reached at a receiving side. A signal receiving intensity of a base station for a terminal k is $g_{ik}p_k$ where $p_k$ denotes the transmission power of the terminal k. Each of elements B(k) of a vector B having M elements denotes a base station connected to a corresponding terminal.

The following Equation 1 shows a signal to interference ratio (SIR). The SIR is used as a reference of system evaluation in a CDMA system.

$$SIR_k = \frac{g_{B(k)k} P_k}{\sum_{j=1, j \neq k}^{M} g_{B(k)j} P_j + \eta} \qquad \text{Eq. 1}$$

where η denotes thermal noise which generated in nature and cannot be controlled.

Each of terminals transmits data to a base station as much as $R_k$. Inter-cell interference is controlled at each of time slots.

The data rate may be calculated from the SIR, based on the following Equation 2.

$$\text{Data Rate} = 10 \times \text{Bandwidth} \times \text{Log}(1 + SIR) \qquad \text{Eq. 2}$$

Meanwhile, a packet scheduler for transmitting non-realtime data uses a proportional fairness (PF) algorithm.

The PF algorithm was developed for a downlink non-realtime data service. The PF algorithm provides a downlink service to a user who had the lowest data rate for a predetermined past time period first although users request a high QoS service such as a high data rate. The downlink service is a service provided in a downlink, and the downlink service is provided to only one user at a predetermined time.

The PF algorithm was introduced to overcome a fairness problem. The fairness problem is arisen if a service is continuously provided a predetermined user having a good link status by a scheduler that only emphasizes system performance such as a data processing amount for a predetermined time period.

The PF algorithm can be also applied to an uplink service. A priority of a user to receive the uplink service is decided based on the following Equation 3.

$$1_k = \frac{D_k^{req}}{D_i} \qquad \text{Eq. 3}$$

where $D_k^{req}$ denotes a data rate that a predetermined user requests. $D_i$ denotes a previously allocated average data rate and is updated at every time slot, based on the following Equation 4.

$$D_k(n+1) = (1 - 1/T) D_k(n) + r_k/T \qquad \text{Eq. 4}$$

where T is a time period for an average value, and $r_k$ denotes a data rate allocated at a time n.

If a user is scheduled, a requested data rate is allocated. However, if not, its value becomes 0.

It is impossible to allocate a user requested data transfer rate using the method for deciding a priority according to the related art if a user requests a comparative high data transfer rate although the user is located at a cell boundary area and has a bad link status. Nevertheless, if the requested data transfer rate is allocated, an amount of interference increases in overall, thereby deteriorating system performance.

SUMMARY OF THE INVENTION

An embodiment of the present invention is directed to providing a method for deciding a transmission priority of non-realtime data, which decides uplink priorities for terminals in a corresponding cell based on a user requested data transfer rate by each cell in order to provide the real user requested data transfer rate although a user at a cell boundary area with bad link status requests a comparatively high data transfer rate.

Another embodiment of the present invention is directed to providing an apparatus and method for controlling inter-cell interference using a transmission priority of non-realtime data, which calculate uplink priorities of terminals in a predetermined cell based on a user requested data transfer rate, provide an uplink service according to the calculated uplink priorities, and interrupt an uplink service of a corresponding cell based on resource utilization and inter-cell interference of a cell in order to improve system performance.

In accordance with an aspect of the present invention, there is provided a method for deciding a transmission priority of non-realtime data, the method including: receiving a user requested data transfer rate; confirming an average data transfer rate allocated previously to a user terminal; and deciding a transmission priority using the received user requested data transfer rate and the previously allocated average data transfer rate.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

BRIEF DESCRIPTION OF THE DRAWINGS

FIG. 2 is a flowchart of a method for controlling inter-cell interference based on a transmission priority of non-realtime data in accordance with an embodiment of the present invention.

DESCRIPTION OF SPECIFIC EMBODIMENTS

Figure 1:
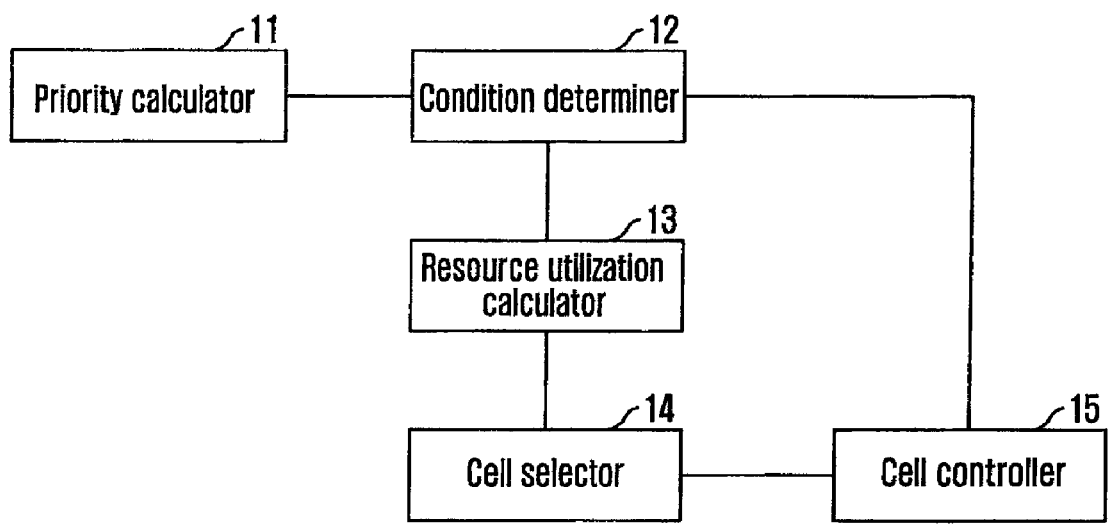
FIG. 1 is a diagram illustrating an apparatus for controlling inter-cell interference based on a transmission priority of non-realtime data in accordance with an embodiment of the present invention.

Hereinafter, embodiments of the present invention will be described using a code division multiple access (CDMA) system as an example. However, the present invention is not limited thereto.

The advantages, features and aspects of the invention will become apparent from the following description of the embodiments with reference to the accompanying drawings, which is set forth hereinafter.

FIG. 1 is a diagram illustrating an apparatus for controlling inter-cell interference based on a transmission priority of non-realtime data in accordance with an embodiment of the present invention.

In general, a CDMA system includes a protocol constructed of seven layers for communication between nodes. Each of the layers has a unique function. Among the layers, a radio resource control (RRC) layer in charge of radio resource control and interworks with a radio resource management (RRM) block that in charge of radio resource management.

The RRM layer is a layer for managing various radio resources in a CDMA system and performs various functions such as call approval, data transfer control, load balancing, and packet scheduler. ICC is also one of functions managed by the RRM layer. That is, the RRC layer controls the ICC layer.

As shown in FIG. 1, the apparatus for controlling inter-call interference using transmission priority of non-realtime data according to the present embodiment includes a priority calculator 11, a condition determiner 12, a resource utilization calculator 13, a cell selector 14, and a cell controller 15. The priority calculator 11 calculates uplink priorities of terminals in a cell using a user requested data transfer rate of each cell. The condition determiner 12 determines whether the number of terminals that receive an uplink service based on the calculated uplink priorities is larger than a predetermined threshold or not. The resource utilization calculator 13 calculates resource utilization of each cell. The cell selector 14 selects a cell generating the most of inter-cell interference based on the calculated resource utilization of each cell. The cell controller 15 sustains an uplink service within a predetermined range not exceeding a predetermined threshold according to the determination result of the condition determiner 12 and interrupts the uplink service in the selected cell.

Hereinafter, a method for controlling an inter-cell interference using transmission priorities of non-realtime data will be described with reference to FIG. 2.

At step S201, the priority calculator 11 calculates an uplink priority of a corresponding user terminal in each cell using the following Equation 5.

That is, a user requested data transfer rate is received.

An average data transfer rate allocated to the user terminal is obtained.

The received user requested data transfer rate is divided by the average data transfer rate.

Then, a transmission priority is decided according to a size of the dividing result.

$$1_k = \frac{R_k^{req}}{D_i} \qquad \text{Eq. 5}$$

where $R_k^{req}$ is the user requested data transfer rate, and $D_i$ denotes the previously allocated average data transfer rate.

Although a user requests a high data transfer rate to transmit a large amount of data, the system performance is not lowered because the priority calculator 11 does not use the data transfer rate requested the user directly.

Unlike a downlink service, an uplink service is simultaneously provided to a plurality of users at a predetermined time. That is, a plurality of users receive uplink services according to priorities calculated by the priority calculator 11.

Users are selected to receive the uplink service in descending order of priorities calculated through Eq. 5. If the uplink service is provided to all of users requesting the uplink service, a large amount of system interference may be generated. Therefore, it is required to control the number of users to receive the uplink service.

In order to effectively control the number of users, rise of thermal (RoT) is used. RoT is a ratio of interference for thermal noise in each cell. RoT is used as measurement how much interference is allowed for a predetermined thermal noise level that cannot be controlled. In the present embodiment, the uplink service is provided to users according to the priorities utile exceeding $ROT_L$ which is a limitation value of ROT defined in a system.

That is, the condition determiner 12 determines whether the number of terminals receiving an uplink service is larger than a predetermined threshold or not at step S202, based on the following Equation 6.

$$RoT_i = \frac{\sum_{j=1}^{M_i} g_{B(j)j} P_j}{\eta} \leq RoT_L \qquad \text{Eq. 6}$$

where $M_1$ denotes the number of users receiving a service in a cell i.

Then, the resource utilization calculator 13 calculates resource utilization of each cell at step S203, based on the following Equation 7.

$$\alpha_i = RoT_i/RoT_L \qquad \text{Eq. 7}$$

where $\alpha_i$ is resource utilization of a system.

As the value of $\alpha_i$ is larger, it means that the resource utilization of the system is higher. As the value of $\alpha_i$ is smaller, it means that the resource utilization of the system is lower.

At step S204, the cell selector 14 selects a cell that generates the most inter-cell interference using the resource utilization calculated by the resource utilization calculator 13. That is, the cell selector 14 selects a cell having low resource utilization and generating the most inter-cell interference, based on the following Equation 8.

$$\beta_i = M_i/\alpha_i \qquad \text{Eq. 8}$$

where $M_i$ is the number of users to be provided with a service in a cell i.

As the value of Mi is larger, it means that many users are located at a cell boundary area. 'More users receive a service for the same ROTL' means that link states of users are not good based on ROT definition. That is, significant inter-cell interference is generated.

Then, the cell controller 15 sustains the uplink service within a range not exceeding a predetermined threshold and interrupts the uplink service in the selected cell according to the determination result of the condition determiner 12 at step S205. That is, a service is not provided to users in the selected cell based on Eq. 8.

It is preferable that the cell controller 15 instantly closes a cell that exceeds a reference range of the condition determiner 12. That is, the cell controller 15 instantly closes a cell that includes more terminals receiving the uplink service than a predetermined threshold.

If a predetermined cell is closed, performance thereof becomes 0. On the contrary, performance of the other cells becomes increased. If performance decrement of the closed cell is larger than performance increment of the other cells, it means that no gain is obtained although the selected cell is closed.

Therefore, it is preferable to close a corresponding cell only if it is determined a predetermined gain is obtained by comparing the performance decrement of the closed cell with the performance increment of the other cells.

Performance before closing may be compared with performance after closing by comparing the sum of SIRs of all users receiving the uplink service. In the present embodiment, SIR is only used for convenience because a data transfer rate is calculated by the same function for all of SIRs.

The following Equation 9 expresses overall performance of a system constructed of N cells before controlling inter-cell interference.

$$\sum_{i=1}^{N}\sum_{k=1}^{M_i} \frac{g_{B(k)k}P_k}{\sum_{j=1,j\neq k}^{M} g_{B(k)j}P_j + \eta} \text{ where } \sum_{j=1,j\neq k}^{M} g_{B(k)j}P_j \quad \text{Eq. 9}$$

denotes overall interference that influences each of users and is divided into three interferences. That is $$\sum_{j=1,j\neq k}^{M} g_{B(k)j}P_j$$

is divided into interference $I_i^c$ from a target cell c to be closed, interference $I_i^{all}$ from all cells except the target cell c, and interference $I_k$ generated from the other users in a corresponding cell.

The following Equation 10 expresses overall system performance.

$$\sum_{i=1}^{N}\sum_{k=1}^{M_i} \frac{g_{B(k)k}P_k}{\sum_{j=1,j\neq k}^{M} g_{B(k)j}P_j + \eta} = \sum_{i=1}^{N}\sum_{k=1}^{M_i} \frac{g_{B(k)k}P_k}{I_i^c + I_i^{all} + I_k + \eta} \quad \text{Eq. 10}$$

The following Equation 11 shows performance of the target cell c to be closed.

$$\sum_{k=1,B(k)=c}^{M_c} \frac{g_{ck}P_k}{\sum_{j=1,j\neq k}^{m} g_{cj}P_j + \eta} \quad \text{Eq. 11}$$

Therefore, the total system performance can be expressed as the following Equation 12.

$$\sum_{i=1}^{N}\sum_{k=1}^{M_i} \frac{g_{B(k)k}P_k}{I_i^c + I_i^{all} + I_k + \eta} = \quad \text{Eq. 12}$$

$$\sum_{i=1,i\neq c}^{N}\sum_{k=1}^{M} \frac{g_{B(k)k}P_k}{I_i^c + I_i^{all} + I_k + \eta} + \sum_{k=1,B(k)=c}^{M_c} \frac{g_{ck}P_k}{\sum_{j=1,j\neq k}^{M} g_{cj}P_j + \eta}$$

If the target cell c is closed, the interference generated from the target cell c is removed from the performance of the target cell c and the other cells. That is, the system performance is expressed as the following Equation 13.

$$\sum_{i=1,i\neq c}^{N}\sum_{k=1}^{M} \frac{g_{B(k)k}P_k}{I_i^{all} + I_k + \eta} \quad \text{Eq. 13}$$

As a result, it is preferable to close the target cell c if Eq. 13 is larger than Eq. 12. That is, the cell controller 15 closes the corresponding cell if Eq. 14 is satisfied. Here, a service will be provided again to the target cell if resource utilization increases and inter-cell interference is generated lower than a predetermined threshold.

$$\sum_{k=1,B(k)=c}^{M_c} \frac{g_{ck}P_k}{\sum_{j=1,j\neq k}^{M} g_{cj}P_j + \eta} < \quad \text{Eq. 14}$$

$$\sum_{i=1,i\neq c}^{N}\sum_{k=1}^{M_i} \frac{g_{B(k)k}P_k I_i^c}{(I_i^{all} + I_k + \eta)(I_i^c + I_i^{all} + I_k + \eta)}$$

where $M_c$ denotes the number of users in the target cell C, $M_i$ is the number of users receiving a service in a cell i, $g_{ck}P_k$ is a signal reception intensity of a base station for a terminal k in the target cell c, B(k) denotes each of element of a vector B having M elements, each B(k) denotes a base station connected to a corresponding terminal, $\eta$ is thermal noise that is generated in nature and cannot be controlled, $I_i^c$ is interference from the target cell c, $I_i^{all}$ is interference from all of cells except the target cell c, and $I_k$ is interference generated by the other users in a corresponding cell.

A fairness problem, the reason of developing an initial PF algorithm, may be identically generated in the target cell c. However, the method for deciding priority according to the present embodiment can easily overcome this problem. Since a service is provided to users according to new priorities generated by Eq. 5 at every time slot in realtime, transmission environment of each cell is changed at every time slot. That is, a probability of continuously selecting only a predetermined cell as a target cell to be closed is significantly low according to the present embodiment.

As described above, the method in accordance with the present invention decides uplink priorities of terminals in a corresponding cell using a user requested data transfer amount of each cell. Therefore, a real user requested data transfer rate can be allocated although a user is located at a cell boundary area, has a bad link state, and requests comparatively high data transfer rate.

Also, the method in accordance with the present invention provide an uplink service according to uplink priorities of terminals in a corresponding cell, which are calculated using a user requested data transfer rate of each cell under a predetermined condition and interrupts an uplink service of a corresponding cell using resource utilization and a degree of inter-cell interference of a cell. Therefore, system performance is improved by controlling interference generated between cells using the same frequency.

The above-described method in accordance with the present invention can be embodied as a program and stored on a computer readable recording medium. The computer readable recording medium is any data storage device that can store data which can be thereafter read by the computer system. The computer readable recording medium includes a read-only memory (ROM), a random-access memory (RAM), a CD-ROM, a floppy disk, a hard disk and an optical magnetic disk.

The present application contains subject matter related to Korean Patent Application No. 10-2007-0069631, filed in the Korean Intellectual Property Office on Jul. 11, 2007, the entire contents of which is incorporated herein by reference.

While the present invention has been described with respect to the specific embodiments, it will be apparent to those skilled in the art that various changes and modifications may be made without departing from the spirit and scope of the invention as defined in the following claims.

What is claimed is:

1. An apparatus for controlling inter-cell interference using a transmission priority of a non-realtime data, the apparatus comprising:
a priority calculator for calculating uplink priorities of terminals in a cell using a user requested data transfer rate of each cell;
a condition determiner coupled to an output of the priority calculator, the condition determiner determining whether a number of terminals provided with an uplink service based on uplink priority calculated by the priority calculator is larger than a predetermined threshold or not;
a resource utilization calculator coupled to an output of the condition determiner, the resource utilization calculator calculating resource utilization of each cell;
a cell selector coupled to an output of the resource utilization calculator, the cell selector selecting a cell that generates largest inter-cell interference using the calculated resource utilization of each cell, which is calculated by the resource utilization calculator; and
a cell controller coupled to an output of the cell selector, the cell controller sustaining an uplink service within a threshold range according to a determination result output by the condition determiner and interrupting an uplink service of the cell selected by the cell selector,
wherein when interrupting the uplink service of the selected cell, the cell controller compares performance increment of the selected cell with performance increment of remaining cells and closes the selected cell if it is determined that gain is generated based on a result of comparing the performance increments.

2. The apparatus of claim 1, wherein the condition determiner uses a limitation value of an interference ratio for thermal noise to determine whether a number of terminals provided with an uplink service according to the calculated uplink priority is larger than a predetermined threshold.

3. The apparatus of claim 2, wherein the resource utilization calculator uses an interference ratio for thermal noise in a corresponding cell and a limitation value of an interference rate for thermal noise to calculate the resource utilization.

4. A method for controlling inter-cell interference in a code division multiple access (CDMA) system comprising a priority calculator, a condition determiner, a resource utilization calculator, a cell selector, and a cell controller, the method comprising:
calculating uplink priorities of terminals in a cell using the priority calculator, wherein the uplink priorities are calculated based on a user requested data transfer rate of each cell;
determining using the condition determiner whether a number of terminals provided with an uplink service based on uplink priority calculated by the priority calculator is larger than a predetermined threshold or not;
calculating using the resource utilization calculator resource utilization of each cell based on an interference ratio for thermal noise in a corresponding cell and a limitation value of an interference rate for thermal noise;
selecting a cell that generates largest inter-cell interference using the cell selector based on resource utilization of each cell calculated by the resource utilization calculator; and
sustaining using the cell controller an uplink service within a threshold range according to a determination result output by the condition determiner and interrupting using the cell controller an uplink service of the cell selected by the cell selector,
wherein when interrupting the uplink service of the selected cell, comparing using the cell controller a performance increment of the selected cell with a performance increment of remaining cells, and closing the selected cell if it is determined that gain is generated based on a result of comparing the performance increments.

5. The method of claim 4, wherein the resource utilization calculating uses an interference ratio for thermal noise in a corresponding cell and a limitation value of an interference rate for thermal noise to calculate the resource utilization.

* * * * *